Aug. 15, 1967     H. G. KEPNER     3,335,750

BALL CHECK VALVE

Filed Oct. 7, 1964

Inventor.
Hugh G. Kepner.

United States Patent Office 3,335,750
Patented Aug. 15, 1967

3,335,750
BALL CHECK VALVE
Hugh G. Kepner, 7321 W. 59th St., Chicago, Ill.
Filed Oct. 7, 1964, Ser. No. 402,080
4 Claims. (Cl. 137—515.5)

ABSTRACT OF THE DISCLOSURE

A valve having ball contained in a cage that is biased against the valve seat by a tension spring. The tension spring is extended to separate the ball from the seat.

My invention relates to valves and has particular reference to a check valve having a valve member urged towards closed position by a tension spring and which is also suspended by the spring centrally of the flow line of material passing through the check valve.

One of the objects of the invention is the provision of a check valve which is urged to closed position by a tension spring sensitive to the line pressure of fluid in the carrying pipe and when in open position in the flow chamber presents a uniform flow opening around the ball valve member which prevents the chattering of the ball member common to most check valves and thereby provides a more uniform flow of fluid through the check valve.

Another and further object of my invention is the provision of a check valve construction which in effect provides for a floating valve member in the flow passage through the valve which prevents foreign material from lodging in the valve and so contaminating the valve that flow therethrough is restricted and ofttimes caused to work improperly by the collection of foreign material lodging in the check valve.

Another and further object of my invention is the provision of a check valve combining the features of construction of patent No. 2,959,188, issued to me on November 8, 1960, for "Check Valve" with an improved type of valve mechanim shown in this patent in the form of a valve member carried by and actuated by a tension spring rather than by a compression spring as is shown in the above-identified patent.

Ball check valves of the usual type use a compression spring for closing purposes which is held in a counterbore at the outlet side of the valve seat flow passage which spring acts directly on the ball opposite to the direction of flow to return the ball to its seat when the flow ceases or falls below a predetermined pressure. In this form the spring is subject to damage when the ball presses on the spring too heavily as when the flow starts suddenly or when there is too much flow for the passage to handle. Also in this type of construction there is no way to guide or hold the ball so that it is thrown around in the flow path because of the turbulence of the flow around it. As a result the valves are noisy and have a short life due to damage on the spring and the valve interior caused by the rapidly oscillating ball.

In some form of design ball-guided pistons are used which ride in the ball and move backward and forward as the ball moves towards open and closed position. In this type of construction the spring is subject to sticking and jamming as well as the ball guide also sticking and jamming by built-up contaminants deposited in the valve from the fluid flowing through the valve.

Another and further object of my invention is to provide a ball valve check mechanism which always holds the ball valve centered in the flow path by tension spring within which the ball valve is mounted and which ball valve does not need to be so accurately machined as is common with the ordinary ball type valves actuated by compression springs thereby reducing the cost of ball type valves of my invention.

These and other objects of my invention will be more fully and readily understood with reference to the accompanying drawings in which FIGURE 1 is a longitudinal sectional view showing a ball type valve of my invention in closed position;

Figure 1:
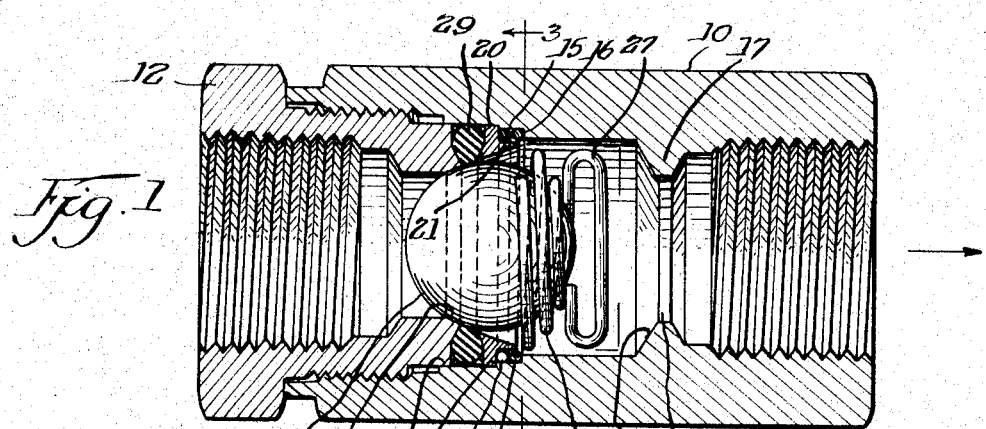

Referring now specifically to the drawings and in which like reference characters refer to like parts throughout, a valve body 10 is shown having a flow passage therethrough which flow passage has a counterbore 11 therein within which the inner end of a closure plug 12 extends. The plug 12 has a flow passage therethrough and a valve seat 13 on the inner end thereof against which the valve member seats as hereinafter described in closed position of the valve. An annular shoulder 14 is formed on the wall of the body member adjacent to the counterbore 11 which extends circumferentially of the flow passage in the valve body 10 for purposes hereinafter described. A second counterbore 15 is provided adjacent the shoullder 14 and has an annular shoulder 16 formed adjacent thereto extending circumferentially of the flow passage which assists in anchoring some of the holding elements in the valve as hereinafter described. An inwardly projecting annular rib 18 is formed on the body 10 which projects into the flow passage 18 therethrough and has an angularly disposed side portion 19 for purposes hereinafter described.

Mounted within the counterbore 11 in the valve body and abutting against the shoulder 14 is a retainer ring 20, said retainer ring 20 having a flange portion 21 on one side thereof and an angularly disposed flange portion 22 on its opposite side for the support of a valve seal hereinafter described. The portion 21 is cut away at 23 for purposes hereinafter described.

A spirally wound frusto-conical tension spring 24 is provided of which spring two end coils 25 and 26 extend substantially circumferentially for the extension 21 on the retainer ring 20 with the end coil 25 in engagement with the side of the retainer ring 20 and around the outer face of the flange 21. The second coil 26 extends around the extension 21 adjacent the coil 25 about 320 degrees when it passes through the cut-out 23 and merges into a third coil of smaller diameter with other coils being formed to the end of the spring 24 which decrease in diameter towards the end of the spring to form a spring in conical form. The final coil terminates in a loop 27 forming an integral part of the spring and which acts as a limit stop for the spring 24 by engaging the angular disposed side 19 on the rib 18 thereby limiting the outward expansive movement of the spring 24.

The spring 24 forms a cage within which a ball valve member 28 is mounted within the larger coils 25 and 26 at one end of the spring 24 through which the ball valve may pass with the coils of the spring decreasing in size towards the discharged end of the valve cage or nest within which the ball 28 is retained and which moves the ball into engagement with the seat 13 on the plug 12 and permits the ball 28 to move away from the seat 13 by flow pressure in the fluid line. The inner end of the plug 12 is in engagement with an O ring 29 which is fitted against the flange 22 on the retaining ring 20 and which when placed under compression by turning the plug 12 into fairly tight relationship slightly expands the O ring and forms a seal for any leakage which may occur between the valve member 26 and the face 11 of the plug 12, and also applies pressure on the retainer ring 20 to hold the retainer ring 20 in position against the shoulder 14 thereby anchoring the retainer ring 20 and the spring 24 with the ball valve 28 within the valve body 10.

In assembling the valve the retainer 20, helical spring 24 and ball valve 28 are fitted together in unit form and placed in the valve body 10 and the unit pushed into position so the retaining ring 20 engages the annular shoulder 13 in the body of the valve whereupon the O ring is next placed into position and the plug 12 turned into position so that all of the parts are held in position in the valve body by the plug 12 and the valve is in position to be attached to threaded pipes, conduits, or the like, for conducting liquid from one point to another. The O ring 29 may be a part of the unit first assembled and placed in position in combination with the unit assembly with the retainer ring 20 or the O ring 29 may be placed after the unit is in position in the valve as preferred.

Figure 2:
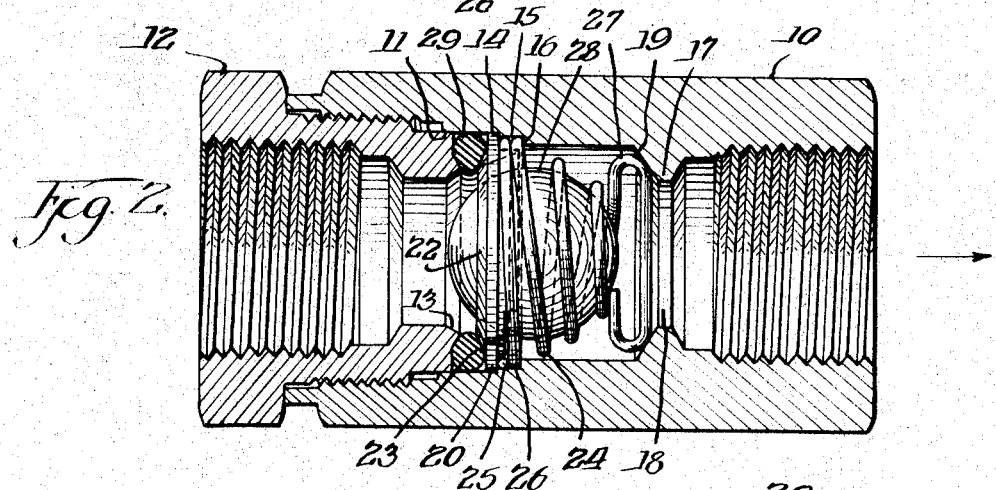
FIGURE 2 is a longitudinal sectional view similar to FIGURE 1 showing the valve in open position.
Figures 3, 4, 5:
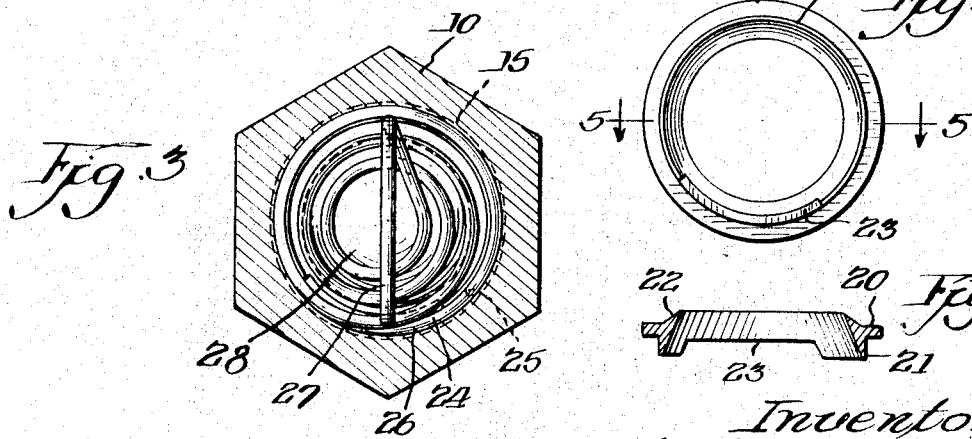
FIGURE 3 is a cross-sectional view on line 3—3 of FIGURE 1.
FIGURE 4 is an elevational view of the retainer in which the actuating spring is mounted at one of its ends.
FIGURE 5 is a cross-sectional view of the spring retaining and seal seating member on line 5—5 of FIGURE 4.

In operation the flow path is from left to right in FIGURES 1 and 2 in the drawings so that as fluid under pressure passes through the flow passage in the plug 12 it engages the ball 28. When the pressure on this side of the valve becomes sufficiently high to overcome any pressure on the opposite side and the force of the spring this pressure removes the ball from the valve seat 13 providing a flow path around the ball 28 allowing the fluid to pass through the valve body 10. Inasmuch as this force is usually constant, the ball 28 will be forced in a linear direction away from its seat providing a flow path around the valve of equal width insuring an even flow of liquid through the valve and positioning the ball 28 centrally of the valve stream thereby providing uninterrupted passage through the check valve with very little opportunity to collect contamination or other material which may be carried by the fluid. Should the force of the fluid be excessive and the valve opened with too much force or forming an excessive amount of force due to pressure of the fluid, the spring portion 27 supports a shock of excessive pressure so that the valve or mounting system may not be damaged by such excessive flow and because of the flexible character of the spring 24 within which the ball 28 is mounted, the ball 28 may enter the seating position at a slight angle thereto and a good seal obtained so that it is not so essential to have accurately machined balls for valve purposes as is the case with ordinary compression type actuated valves, and likewise there is no necessity for such accurate machining of the bore through the body of the valve as is the case with a piston type valve or a ball type valve with a centering device which must be very accurate with respect to the bore of the valve so as to provide the proper flow passage therethrough.

It is to be understood that this application is not limited to the exact embodiment of the device shown, which is merely by way of illustration and not limitation as various and other forms of the device will, of course, be apparent to those skilled in the art without departing from the spirit of the invention or the scope of the claims.

I claim:

1. A valve comprising in combination a valve body having a flow passage therethrough, a removable plug in threaded engagement with the valve body having a valve seat on its inner end, a spring retaining ring removably mounted in the valve body having an extension on one of its sides, a spirally wound conical tension spring in the bore of the valve body, the said spring at one of its ends having coils extending around the extension on the said spring retaining ring whereby the said spring is secured to the said retaining ring, the said spring having other coils of lesser diameter than said first mentioned coils fashioned into a ball valve retaining cage floating in the flow passage of the valve body, and a ball valve member in the said ball retaining cage in the said spring.

2. A valve comprising in combination, a valve body having a flow passage therethrough, a removably plug in engagement with the valve body having a bore communicating with said flow passage and having valve seat means on its inner end, retaining means contained in the valve body for holding a spring, a helically wound tension spring in said flow passage of the valve body, said spring at one of its ends having coils held by said retaining means whereby the one end of said spring is secured by said retaining means, said spring having other coils of lesser diameter than said first mentioned coils fashioned into a ball valve retaining cage floating in the flow passage of the valve body, and a ball valve member in the said ball retaining cage of said spring biased against said valve seat means.

3. A valve comprising in combination a valve body having a flow passage therethrough and a circumferential rib around said flow passage, a removable plug in threaded engagement with said valve body and having a valve seat on its inner end, a spring retainer mounted in said valve body and having an extension thereon, a spirally wound conical tension spring, one end of said spring having coils extending around the extension on said spring retainer whereby said spring is secured to said retainer, said spring having other coils of lesser diameter than said first mentioned coils fashioned into a ball valve retaining cage in the flow passage of the valve body, a U-shaped limit stop in the free end of said spring for engagement with the rib in the valve body, and a ball valve member nested into and carried by the said spring and movable to closed position on said valve seat by the tension of said spring.

4. A valve comprising in combination a valve body having a flow passage therethrough and an internal circumferential rib around said flow passage, a removable plug in threaded engagement with said valve body and having a valve seat on its inner end, a spring retainer mounted in said valve body and having an extension thereon, a spirally wound conical tension spring, one end of said spring having coils extending around the extension on said spring retainer whereby said spring is secured to said retainer, said spring having other coils of lesser diameter than said first mentioned coils fashioned into a ball valve retaining cage in the flow passage of the valve body, an elongated coil on the free end of the said spring for engagement with the internal circumferential rib in the valve body as a limit stop for said spring, and a ball valve member nested into and carried by the said spring and movable to closed position on said valve seat by the tension of said spring.

References Cited

UNITED STATES PATENTS 2,249,971  7/1941  Mecorney _____ 137—537
2,699,179  1/1955  Hansen et al. __ 137—543.17 X
2,959,188  11/1960  Kepner _____ 137—539 X ALAN COHAN, *Primary Examiner.*

D. J. ZOBKIW, *Assistant Examiner.*